United States Patent [19]

Miller

[11] 4,025,900

[45] May 24, 1977

[54] RACE TALLY APPARATUS

[75] Inventor: James A. Miller, Chatsworth, Calif.

[73] Assignee: Bell & Howell Company, Chicago, Ill.

[22] Filed: June 3, 1976

[21] Appl. No.: 692,499

[52] U.S. Cl. .............................................. 340/172.5

[51] Int. Cl.[2] .................... G06F 15/06; G06F 15/44

[58] Field of Search ............. 273/86, 138 A; 194/6; 42/244; 340/172.5; 445/1; 328/153

[56] References Cited

UNITED STATES PATENTS

| | | | |
|---|---|---|---|
| 3,124,674 | 3/1964 | Edwards et al. | 340/172.5 X |
| 3,252,149 | 5/1966 | Weida et al. | 340/172.5 |
| 3,439,281 | 4/1969 | McGuire et al. | 328/153 |
| 3,505,646 | 4/1970 | Affel, Jr. et al. | 340/172.5 |
| 3,645,531 | 2/1972 | Wright | 273/138 A |
| 3,709,493 | 1/1973 | Lally | 273/86 F |
| 3,717,345 | 1/1973 | Baneville | 273/86 |
| 3,729,193 | 4/1973 | Labis | 273/86 B |

*Primary Examiner*—Harvey E. Springborn
*Attorney, Agent, or Firm*—Richard L. Myers

[57] ABSTRACT

An apparatus for tallying the finish results of a plurality of racing members includes for each one of the racing members a sensor having properties for providing an electrical signal in response to the arrival of the associated racing member at a finish line. A memory includes a separate plurality of registers for each of a win, place, show and also ran finish position. In accordance with the associated method, information representative of a particular finish position is tallied in an associated plurality of registers and decoded to determine if more than one of the racing members had finished within a predetermined time interval representative of a tie finish state.

If a tie is detected, a particular signal is produced representative of a double, triple or quadruple tie finish state. In response to this particular signal, the address of the registers associated with a different finish position is produced. This address is loaded into an address register in response to an enabling signal which is produced from the particular signal and delayed a period of time greater than the predetermined time interval. The address stored in the address register then activates the associated plurality of registers in the memory to receive the information associated with the next finishing racing member.

17 Claims, 5 Drawing Figures

RACE TALLY APPARATUS

BACKGROUND OF THE INVENTION

1. Field of the Invention

This invention is concerned primarily with racing apparatus and more specifically with apparatus for tallying the finish results of a plurality of racing members.

2. Description of the Prior Art

Racing apparatus of the prior art and particularly racing games have included a plurality of racing members which race between a start line and a finish line. Such racing apparatus have typically included means for tallying the finish results of the racing members. For example, various sensors have produced electrical signals upon detecting the arrival of each of the racing members at the finish line. These electrical signals have been processed to tally the race results and provide an indication of the order of finish of the racing members. In one type of race game including four racing members, indicia associated with the respective racing members have been displayed in a "win" position, a "place" position, a "show" position, and a "also ran" position. One such racing game is disclosed and claimed in U.S. Pat. application Ser. No. 650,555 filed on 03/01/76 by Inventors.

In these race tally apparatus of the prior art, one of the racing members has been tallied in each of the finish positions. There has been no capability for indicating a "tie" race condition which results when more than one of the racing members arrive at the finish line simultaneously.

SUMMARY OF THE INVENTION

The tally apparatus of the present invention has a capability for tallying the finish positions of the racing members in each of the win, place, shown and also ran positions; it also has a capability for tallying multiple win, place and show conditions when more than one of the racing members arrive at the finish line within a predetermined time interval. The apparatus of the present invention also has a capability for adjusting the duration of that predetermined time interval.

In one form of the present invention, the electrical signals provided by the finish sensors are loaded into a memory having storage addresses which are arranged in a plurality of columns equal in number to the number of finish positions, and a plurality of rows equal in number to the number of racing members. Upon the arrival of the first finishing racing member at the finish line, the associated electrical signal is introduced into one of the registers in the first column of registers. If the second racing member arriving at the finish line arrives substantially simultaneously with the first arriving member, the associated electrical signal of the second arriving member is also introduced into the first column of registers.

The information thus stored in the first column of registers is read out of the tally memory into a tally decoder which provides a signal signifying either a single, double, triple or quadruple win state. This signal is decoded to provide a memory address associated with that column which is to receive the electrical signal associated with the next finishing racing member. This tally logic also provides a step pulse which is delayed an interval of time associated with the predetermined time interval. The step pulse is used to introduce the memory address from the tally logic into a write address register which activates the associated column of registers in the memory to receive the next input signal.

For example, if the first and second finishing racing members reach the finish line within the predetermined time interval, a tie win state is produced so that two of the racing members are indicated in the win position while the third arriving and fourth arriving racing members are indicated in the show position, and the also ran position, respectively. Since two of the racing members are indicated in the win position, there is no racing member indicated in the place position. Under these conditions, the tally decoder would signify a double win state and the memory address written into the write address register would be the address of the third column of registers associated with the show finish position.

The step pulse can also be used to inhibit the electrical signals at the input of the tally memory prior to the time the next column of registers is activated so that those electrical signals associated with members which have already been tallied are not also loaded into the next column of registers.

At the completion of the race, readout circuits can sequentially activate the columns of registers in the memory to introduce the associated information to a tally display. Under the finish conditions of the example previously discussed, the tally display would show two of the racing members in the win position and the remaining two racing members in the show and also ran positions.

An associated method includes steps for tallying the activation of a plurality of members each having properties for switching from a nonactivated state to an activated state. These steps include providing a clock signal having in each of a first period and a second period, a first time interval and a second time interval. During the first time interval of the first period, a particular signal representative of the number of members in the group is provided. Then in the first time interval of the second period a second group of the members which have switched to the activated state can be tallied. A presentation of the results of the tally can be made by displaying in a plurality of consecutive timing categories, a first group of members in a first category and a second group of members in a second category. The method also provides for separating the first category and the second category by a number of categories equal to the number of members in the first group minus one.

These and other features and advantages of the present invention will become more apparent with a description of preferred embodiments and reference to the associated drawings.

DESCRIPTION OF PREFERRED EMBODIMENT

In a typical racing apparatus, a plurality of racing members (not shown), such as horses, dogs, or cars, race between a starting line and a finish line. Although the invention will be described with reference to an apparatus including four such racing members, designated No. 1, No. 2, No. 3 and No. 4, it will be understood that the apparatus may include any plurality of racing members.

Figure 1:
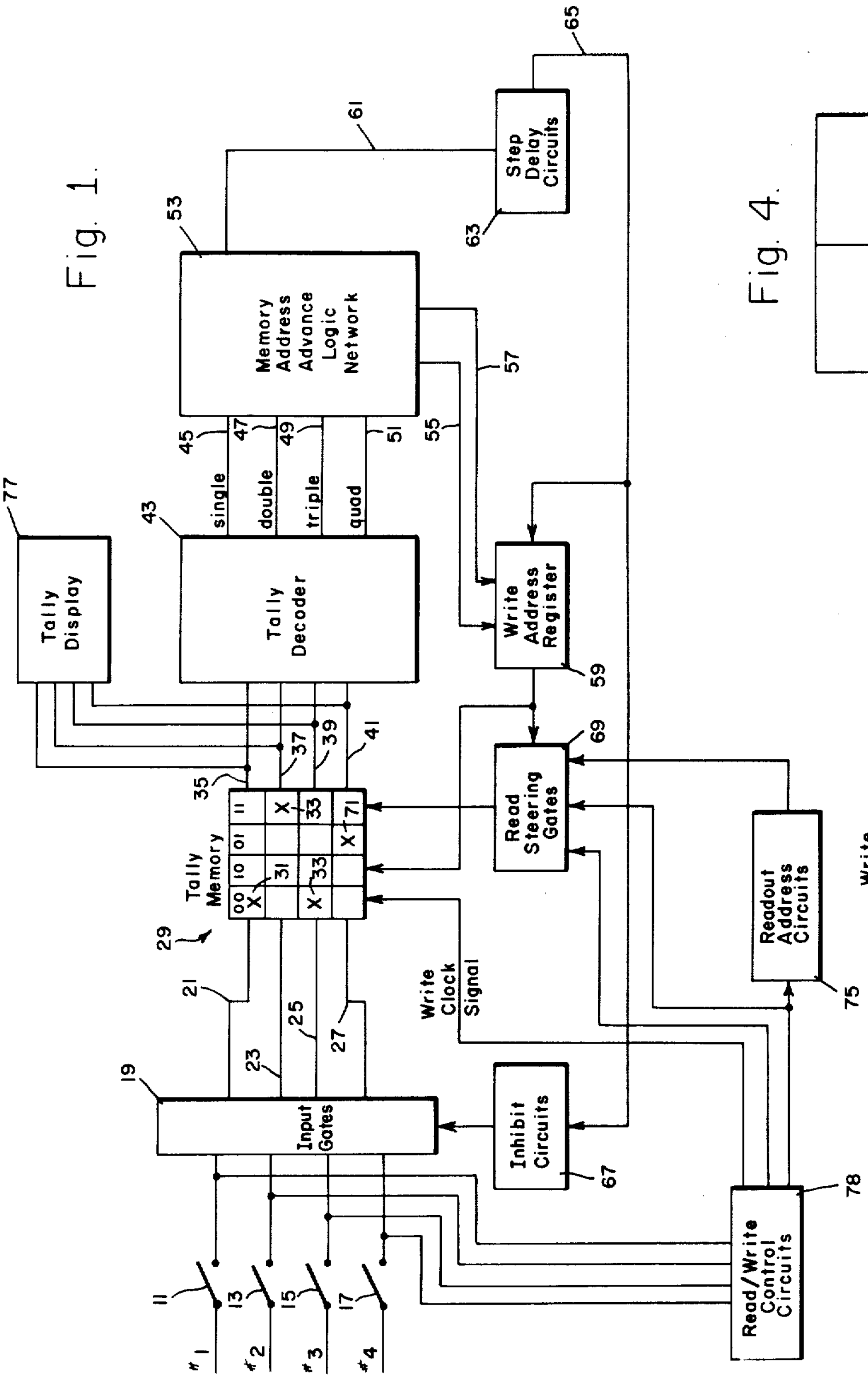
FIG. 1 is a block diagram of one form of a preferred embodiment of the present invention.
Figure 4:
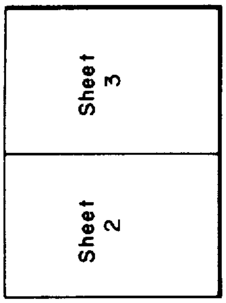
FIG. 4 illustrates the juxtaposition of FIGS. 2 and 3 to provide a composite detailed diagram of one embodiment of the apparatus of the present invention.

In a preferred embodiment, a sensor switch is mounted at the finish line for each of the racing members No. 1–No. 4. In FIG. 1, these sensor switches, which may be proximity switches, are designated by the reference numerals 11, 13, 15 and 17. The sensor switches 11–17 are selectively actuated upon the arrival of the associated racing members No. 1–No. 4 at the finish line. When actuated, the switches 11–17 introduce an associated electrical signal to a plurality of input gates 19. These electrical signals can be passed through the gates 19 and introduced on respective conductors 21, 23, 25 and 27 to the input of a tally memory 29.

The tally memory 29 includes a plurality of registers arranged in a plurality of rows and a plurality of columns. In a preferred embodiment the number of rows is equal to the number of racing members and the number of columns is equal to the number of finish positions being tallied. For example, in the illustrated embodiment including four racing members and four finish positions, there are four rows and four columns in the tally memory 29. The columns in the tally memory 29 can be designated by their respective binary addresses 00, 10, 01 and 11. These columns are also representative of the finish positions win, place, show and also ran, respectively. Each of the columns includes a register for each of the conductors 21–27.

When the memory 29 is initially energized, the column of registers having the address 00 can be activated to receive any of the electrical signals which appear on the conductors 21–27. For the purposes of explanation, it might be assumed that the racing members finish in the order 1, 3, 4 and 2, with the racing members 1 and 3 arriving at the finish line substantially simultaneously. Under such conditions, the electrical signals would first appear on conductors 21 and 25 and would be stored in the registers as shown by the Xs 31 and 33 respectively. As used herein, the words "substantially simultaneously"to means that more than one of the racing members finish within a relatively short predetermined time interval.

The information in column 00 can be read out of the memory 29 on a plurality of conductors, designated by the consecutively odd reference numerals between 35 and 41, and introduced to a tally decoder 43. The decoder 43 has properties for decoding the signals on the conductors 35–41 to determine if there is a multiple finish state associated with the particular column of the memory 29 which is being analyzed. Signals indicative of a single, double, triple or quadruple finish state are provided at the output of decoder 43 on respective conductors 45, 47, 49 and 51. These signals can be introduced to a memory address advanced logic network 53 which produces on conductors 55 and 57 an address associated with that column of the memory 29 which is to be activated to receive the next electrical signal on the conductors 21–27. In the example previously discussed, wherein two of the racing members finish in the win position, there would be no indication for a racing member finishing in the place position. Under such circumstances, the next arriving racing member should not be tallied in the place column 10 but rather should be tallied in the show column 01. In the case of the example, it is this address 01 of the show column that would be produced on the conductors 55 and 57 and provided at the input to a write address register 59.

The network 53 also provides a signal on a conductor 61 which is ultimately used to advance the memory 29. Since the signal on the conductor 61 appears at approximately the same time as the signals on the conductors 21–27, it is desirable to delay this signal at least an interval of time greater than the predetermined time interval. This will insure that the memory is not advanced until all of the racing members finishing within the predetermined time interval have been included in a determination of whether there has been a multiple finish. In a preferred embodiment wherein the predetermined time interval is two microseconds, the conductor 61 is introduced to a step delay circuit 63 which provides a delay of four microseconds. This delayed signal can then be introduced on a conductor 65 to the write address register 59 and also an inhibit circuit 67.

At the write address register 59, the delayed signal on the conductor 65 enables the register 59 to receive the address information from the conductors 55 and 57. This address information is introduced from the write address register 59 through a plurality of read steering gates 69 to activate the appropriate column in the memory 29. The appropriate column will, of course, vary with the determination as to the number of racing members which had their finish information tallied in the previously activated column in the memory 29.

In the case of the example previously discussed wherein the racing members 1 and 3 tied for the win position, the address of the show column 01 in the memory 29 would be loaded into the register 59. This address information would then pass through the read steering gates 69 to activate the show column 01 of memory 29. With the column 01 thus activated, the racing member next arriving at the finish line would provide an electrical signal on its associated conductor 21–27 and this electrical signal would be introduced into the activated column, the show column 01. in the memory 29. Continuing with the example, the third finishing racing member might be the racing member 4. In such an event, an electrical signal would be introduced on the conductor 27 and stored in the show column 01 as shown by the X 71 in the memory 29.

In a particular embodiment, each of the racing members is halted at the finish line at the completion of its final lap. In such an embodiment, the sensor switches 11–17 of these finished members are typically maintained in a closed state so that the associated electrical signals remain on the associated conductors 21–27. Since these signals have already been stored in the memory 29 and tallied by the apparatus, it is desirable that they be inhibited so that they are not retallied when a new column in the memory 29 is activated.

In the tally apparatus of the present invention, the signal on the conductor 65 is introduced through the inhibit circuits 67 to the input gates 19. This signal inhibits those input gates associated with the racing members which have already finished the race. This is of particular advantage since only those input gates 19 associated with the racing members which have not finished the race remain operative to introduce their electrical signals to the next activated address column in the memory 29. In the example previously discussed, only the input gates 19 associated with the racing members 2 and 4 would remain open to introduce their signals to the show column 01 of the memory 29. Then when the racing member 4 arrived at the finish line, only the electrical signal on the conductor 27 would be stored in the show column 10 as shown by the X 71.

To complete the example, if the racing member 2 did not finish within the predetermined time interval of the racing member 4, the tally decoder 43 would detect a single finish in the show column 01, and the also ran column 11 would be activated to receive the final finish information. Then when the racing member 2 finished the race, its tally information would be stored in an also ran column 11 as shown by the X 73.

Once the columns in the memory 29 have been loaded, and all of the racing members have finished the race, a plurality of readout circuits 75 can be activated to sequentially read out the information in the memory 29. In a preferred embodiment this information is read out onto the conductors 35–41 and into a visual tally display 77.

Figure 5:
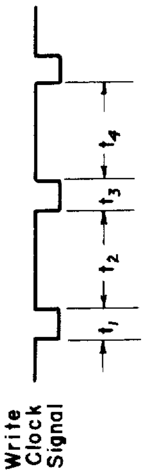
FIG. 5 is an illustration of a periodic clock signal particularly adapted for use with one form of a preferred embodiment of the present invention.

The proper sequence of operations can be maintained by control circuits 78 which include a write clock providing a clock signal such as that illustrated in FIG. 5. The clock signal is periodic and includes a first period having a first interval of time $t_1$ and a second interval of time $t_2$, and a second period having a first time interval $t_3$ and a second time interval $t_4$. During the first time interval $t_1$ of the first period, the tally memory 29 is activated to receive and store any information associated with closure of the switches 11–17 prior to the time interval $t_2$. A first group of the racing members finishing prior to the time interval $t_2$ will be tallied in the same finish position during the time interval $t_1$. This first group may consist of one or more of the racing members 1–4.

During the second time interval $t_2$ of the first period, the tally decoder 43 will determine the number of members in the first group. Then, during the first time interval $t_3$ of the second period, the switch closures which occurred during the second time interval $t_2$ of the first period and the first time interval $t_3$ of the second period can be tallied in the memory 29. These switch closures are associated with a second group which may include one or more of the racing members 1–4.

Ultimately, the first group of racing members will be displayed in the win position. The second group of racing members will be displayed in a finish position separated from the win position by a number of finish categories equal to the number of members in the first group minus one. For example, with an apparatus including finish categories of win, place, show and also ran, a first group of racing members including three members might be tallied in the win position and a fourth member tallied in the also ran position. It will be noted that the number of finish categories separating the win position and the also ran position is equal to the number of members in the first group (three) minus one. In other words the win and also ran finish positions are separated by two finish categories, namely the place and show finish categories.

Figure 2:
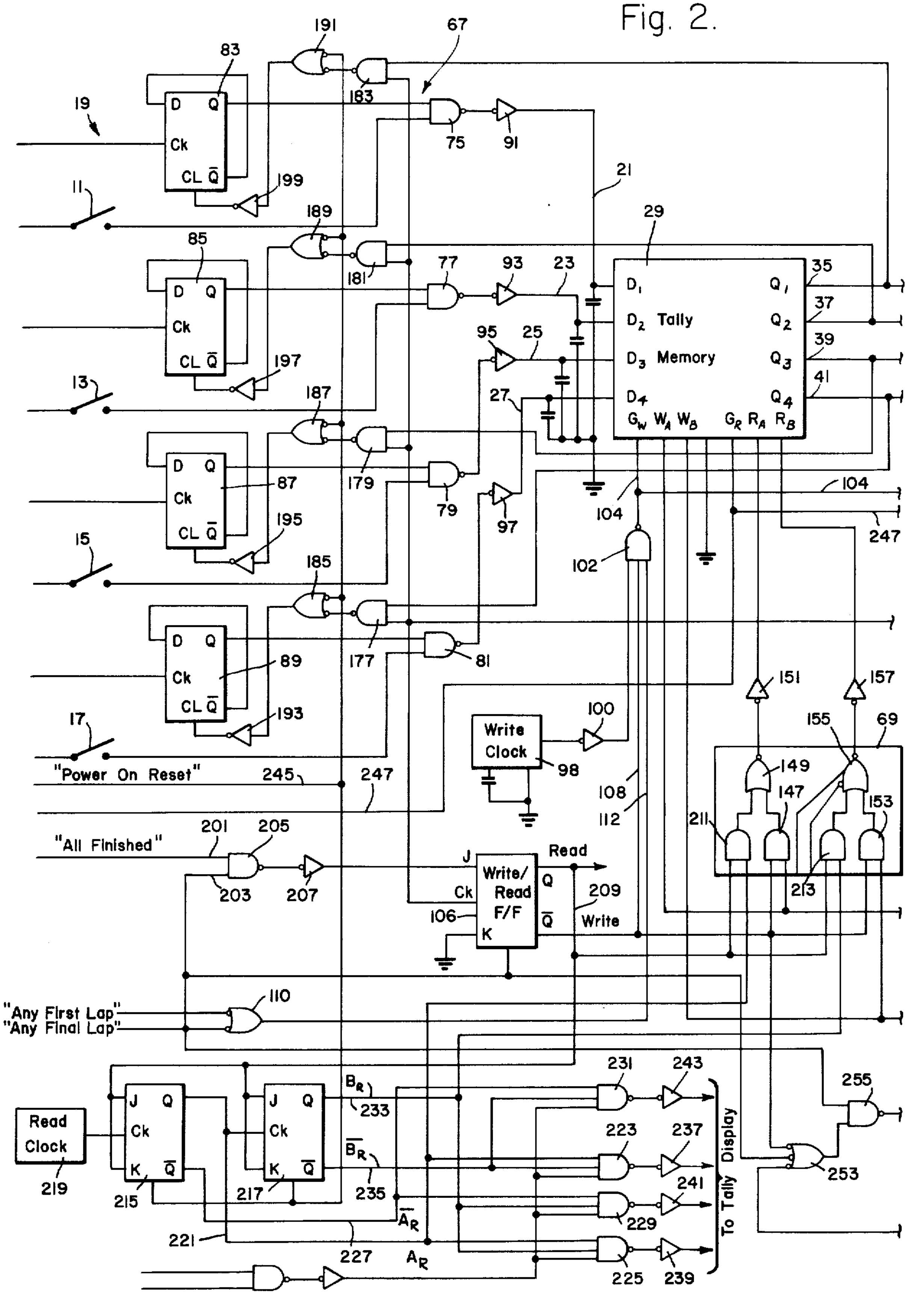
FIG. 2 illustrates in greater detail a first portion of the block diagram of FIG. 1.
Figure 3:
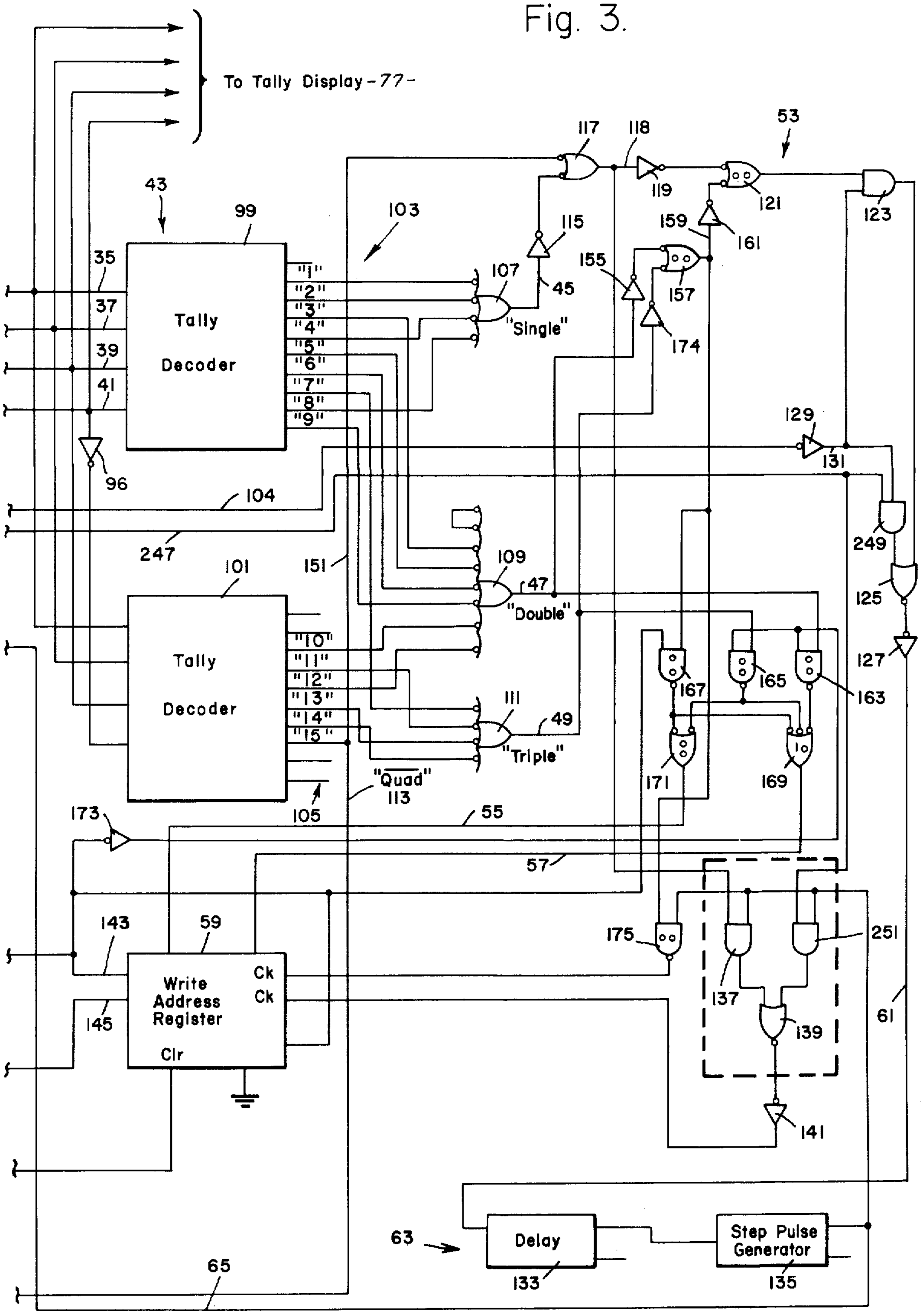
FIG. 3 illustrates in greater detail a second portion of the block diagram of FIG. 1.

Referring now to FIGS. 2 and 3, it will be apparent that in a particular embodiment, each of the racing members 1–4 may be provided with a pair of input signals. The first signals may indicate that the associated racing member has begun the final lap while the second signal may indicate that the associated racing member has completed the final lap and arrived at the finish line. It is these second input signals which are passed by the associated sensor switches 11–17 as previously discussed. These signals can then be introduced to an associated NAND gate 75, 77, 79 and 81 in the input gates 19. The gates 19 may also include a D type flip-flop 83, 85, 87 and 89 for each of the respective racing members 1–4.

The input signals which signify the beginning of the final lap for each of the racing members 1–4 can be introduced to the clock terminal of the associated flip-flop 83–89. The Q terminal of each of the flip-flops 83–89 can also provide an input to the respective NAND gates 75–81. Finally, the Q terminal can be directly connected to the D terminal to provide a feedback loop in each of the flip-flops 83–89.

The output of the respective NAND gates 75–81 can be introduced through an associated inverter 91, 93, 95 and 97 onto the respective conductors 21–27 which provides the inputs to the tally memory 29. The tally memory 29 can be a 4 × 4 memory such as the type commonly designated by the catalog No. 74170. With such a memory, the conductors 21–27 can be connected to the D terminals of memory 29 while the Q terminals provide the output of the memory 29 on the conductors 35–41.

In an embodiment wherein the racing members remain at the finish line at the completion of the race, the associated electrical signals on the conductors 11–17 will typically remain high. If the next column of registers in the memory 29 is activated, these high signals, which have already been tallied, will also be recorded in the newly activated column of registers. This of course is undesirable. On the other hand, if those signals which have already been tallied are deactivated prior to the activation of the new column of registers, the deactivation of the signals will result in erasing the information in the previously activated column of registers. This also is undesirable.

This problem is solved in the preferred embodiment by providing a write clock 98 which introduces a clocking signal through an inverter 100 to provide an input to a NAND gate 102. The output of the NAND gate 102 is introduced on a conductor 104 to the terminal $G_w$ of the memory 29.

The write clock 98, which can be of the type designated by the catalog No. NE 555, provides a clocking signal such as that illustrated in FIG. 5. This clocking signal in the preferred embodiment is periodically low for two microseconds and high for eight microseconds. For example, during the first period the clock signal is low during the first time interval $t_1$ and high during the second time interval $t_2$. Similarly, in the second period the clocking signal is low during the first time interval $t_3$ and high during the second time interval $t_4$.

During the time that the clocking signal is low, the uninhibited electrical signals on the conductors 21–27 are received by and stored in that columns of the registers which has been activated in the memory 29. When a particular racing member, such as the member 1, finishes the race, the electrical signal associated with the racing member remains high on the associated conductors 21–27. This electrical signal stands by to be loaded into the registers in the memory 29 until the next low clock period, such as the two microsecond period $t_1$, occurs on the terminal $G_{w}$. If another racing member, such as the member 3, finishes substantially simultaneously with this particular racing member, then the electrical signal on the associated electrical conductor of the second finishing member will be loaded in the same column of registers as that of the first finishing member.

In the illustrated embodiment, these electrical signals can only be loaded during the time interval when the signal from the clock 98 is low, that is, for example, during the two microsecond time intervals $t_1$ or $t_3$. In order for two or more racing members to have finishing signals which are loaded in the same column of registers, the racing members must finish within one period of the write clock 98, such as the period defined by the time intervals $t_2$ and $t_3$.

With further reference to FIG. 5, it will be noted that the clock period includes the second time interval $t_2$ which in the preferred embodiment is equal to eight microseconds. Several functions can occur advantageously during this interval $t_2$. First, the memory 29 can be deactivated from receiving any switch closure information. Second, the finish information in the previously activated column can be decoded to determine if there has been a multiple finish. Third, the memory 29 can be appropriately advanced so that during the first interval $t_3$ in the next period, a new column can be activated to receive additional finish information. As a solution to the problem previously discussed, it is particularly advantageous that during the interval $t_2$ when the memory 29 is deactivated, those previously recorded signals on the conductors 21–27 can be inhibited. Without altering the information already recorded in the memory 29, this will insure that only those switch closures which occur during the intervals $t_2$ and $t_3$ will be recorded in the next activated columns in the memory 29. It follows that any number of the racing members 1–4 finishing within the time of a single clock period, such as $t_2$ plus $t_3$, will be tallied in the same finish position.

As used herein, racing members finishing within an interval equal to one period of the clock 98 will be referred to as finishing substantially simultaneously. It can be appreciated however, that in different embodiments of the invention, many different clock signals can be developed to load the memory 29 in this manner.

A write/read flip-flop 106 can provide signals indicative of the mode in which the tally apparatus is currently operating. When the memory 29 is to be loaded, a signal indicative of a write mode can provide an input to the NAND gate 102 on a conductor 108. A signal indicating the presence of any racing member in the final lap can be introduced through a NOR gate 110 to provide on a conductor 112 a further input to the NAND gate 102.

The tally decoder 43 can include a pair of decoders, such as those commonly designated by the catalog No. 7442, each of which is connected to receive input signals from the conductors 35–39. The signal on the conductor 41 is introduced directly to the decoder 99 and is introduced through an inverter 96 to the decoder 101. It is the purpose of the tally decoder 43 to provide a decimal output for the binary coded input on the conductors 35–41.

The binary coded numbers on the conductors 35–41 of the output of the memory 29 will correspond to those electrical signals stored in the activated column of registers in the memory 29. This can be more easily understood by referring to the tally memory 29 in FIG. 1 where, in the example described, information was stored in the first and third registers of the win column 00. With information thus stored in the first and third registers, such a column would provide a binary coded number of 1010 on the conductors 35–41. The binary coded number for the column 10 would be 0001 indicative of the X 71 in the fourth register of the column. Similarly, the binary coded number for the column 11 would be 0100 indicative of the X 73 in the second register of the column.

It can be seen in this particular embodiment, that the presence of three ones in a binary coded number would indicate a three way tie for the associated finish position. Similarly, the presence of two ones would indicate a two way tie for the associated finish position, and the presence of only a single one would indicate a single placement in the associated finish position.

In the following table, all of the combination of a binary number are tabulated for a tally apparatus including four racing members. In this table, the racing members 1–4 are designated by the letters A, B, C and D. The finish result corresponding to each of the binary coded numbers is set forth under the letter R where the notation refers to a single (S), double (D), triple (T) and quadruple (Q) finish state.

The table illustrates the fifteen possible combinations for the win finish state, the eight possible combinations for the place finish state, the four combinations for the show finish state, and the two combinations for the also ran finish state.

| | Win | | | | | Place | | | | Show | | | Also Ran | |
|---|---|---|---|---|---|---|---|---|---|---|---|---|---|---|
| | A | B | C | D | R | A | B | C | R | A | B | R | A | R |
| 0 | 0 | 0 | 0 | 0 | 0 | 0 | 0 | 0 | 0 | 0 | 0 | 0 | 0 | 0 |
| 1 | 1 | 0 | 0 | 0 | S | 1 | 0 | 0 | S | 1 | 0 | S | 1 | S |
| 2 | 0 | 1 | 0 | 0 | S | 0 | 1 | 0 | S | 0 | 1 | S | | |
| 3 | 1 | 1 | 0 | 0 | D | 1 | 1 | 0 | D | 1 | 1 | D | | |
| 4 | 0 | 0 | 1 | 0 | S | 0 | 0 | 1 | S | | | | | |
| 5 | 1 | 0 | 1 | 0 | D | 1 | 0 | 1 | D | | | | | |
| 6 | 0 | 1 | 1 | 0 | D | 0 | 1 | 1 | D | | | | | |
| 7 | 1 | 1 | 1 | 0 | T | 1 | 1 | 1 | T | | | | | |
| 8 | 0 | 0 | 0 | 1 | S | | | | | | | | | |
| 9 | 1 | 0 | 0 | 1 | D | | | | | | | | | |
| 10 | 0 | 1 | 0 | 1 | D | | | | | | | | | |
| 11 | 1 | 1 | 0 | 1 | T | | | | | | | | | |
| 12 | 0 | 0 | 1 | 1 | D | | | | | | | | | |
| 13 | 1 | 0 | 1 | 1 | T | | | | | | | | | |
| 14 | 0 | 1 | 1 | 1 | T | | | | | | | | | |
| 15 | 1 | 1 | 1 | 1 | Q | | | | | | | | | |

It is the purpose of the tally decoder 43 to analyze these binary coded numbers to ascertain if there has been a single, double, triple or quadruple finish in the associated finish position. In the preferred embodiment, this is accomplished by providing at the output of the decoders 99 and 101 decimal equivalents of the binary coded input numbers. In an embodiment including four racing members, there are fifteen different combinations in the binary coded number which are of interest. The first nine of these combinations can be provided as outputs on conductors 103 shown generally at the output of the decoder 99. The remaining six decimal numbers can appear as signals on conductors 105 at the output of the decoder 101.

The binary coded numbers which are equivalent to the decimal numbers 1, 2, 4 and 8 have a single one appearing in the number. Thus, these decimal numbers are indicative of a single finish state. The associated conductors at the output of the decoder 99 can be introduced to a NOR gate 107. This NOR gate 107 can be of the type commonly designated by the catalog No. 7420.

In a similar manner, the decimal numbers 3, 5, 6, 9, 10 and 12 have binary coded equivalents having two ones appearing in the number These decimal numbers are therefore indicative of a double finish state. In a preferred embodiment the conductors associated with these numbers are introduced to a NOR gate 109. The NOR gate 109 can be of the type commonly designated by a catalog No. 7430.

In like manner, the binary coded numbers having decimal equivalents 7, 11, 13 and 14 will include three ones indicative of a triple finish state. The conductors associated with these decimal equivalents can be introduced to a NOR gate 111 which can be of the type commonly designated by the catalog No. 7420.

Finally, the binary coded number including four ones and being indicative of a quadruple finish state has a decimal equivalent of fifteen. When such a number appears on the conductors 35–41, a signal designated $\overline{QUAD}$, appears on a conductor 113, at the output of the decoder 101.

The output of the NOR gate 107 is provided on the conductor 45 and introduced through an inverter 115 to a NOR gate 117 in the memory address advance logic network 53. The conductor 113 indicating the $\overline{QUAD}$ finish state is also connected to the NOR gate 117. The output of the NOR gate 117 can be serially connected through a conductor 118, an inverter 119, a NOR gate 121, an AND gate 123, a NOR gate 125, and an inverter 127 to the conductor 61.

The timing of the memory address advance logic network 53 is controlled by the gated clock signal on the conductor 104. This signal can be introduced through an inverter 129 to provide on a conductor 131 a further input to the AND gate 123. When the signal on the conductor 131 is high, for example during the two microsecond period of the gated clock signal, the signal from the NOR gate 121 is enabled through the AND gate 123 and appears on the conductor 61.

The signal on the conductor 61 can be introduced through a delay 133 and a step generator 135 which provides a step pulse on the conductor 65. It is this step pulse signal on the conductor 65 which is used in the illustrated embodiment to index the columns of registers in the memory 29. It is desirable to delay this indexing beyond the time interval $t_2$ in which the signals on the conductors 21–27 are loaded into the register. In this particular embodiment wherein this loading takes place in the two microsecond interval $t_2$, the delay 133 preferrably has a period greater than two microseconds. The signal on the conductor 65 can be introduced to an AND gate 137 together with a signal from the conductor 118 which is indicative of the single finish state. The resulting signal from the AND gate 137 can be introduced through a NOR gate 139 and an inverter 141 to a clock terminal of the write address register 59. This indexes the register 59 by a single address. The write address register 59 can be of the type commonly designated by the catalog No. 74196.

The write address register 59 provides an output on a pair of conductors 143 and 145 which are connected to a pair of write address terminals $W_A$ and $W_B$ respectively in the memory 29. It follows that the address stored in the register 59 is the address of the column of registers in the memory 29 which is activated to receive the input electric signals from the conductors 21–27. By way of example, if the column of registers 01 indicative of the show finish position had been activated and a single finish state had been detected, the write address register 59 would be indexed one address in order to activate the also ran column of registers 11.

The write address register 59 also activates a particular one of the columns of registers in the memory 29 to be read out from memory 29. This readout address is controlled by the read address steering gates 69 which are connected to the output of the write address register 59. For example, the conductor 143 can be connected to the input of an AND gate 147 along with the conductor 108 from the write/read flip-flop 106. The output of the AND gate 147 can be introduced through a NOR gate 149 and an inverter 151 to a read address terminal $R_A$ in the memory 29. The same conductor 108 can also be connected to the input of an AND gate 153 with the conductor 145 from the register 59. The output of the AND gate 153 can be introduced through a NOR gate 155 and an inverter 157 to a read address terminal $R_B$ in the memory 29. Thus, when the write/-read flip-flop 106 is in the write mode, the address stored in the write address register 59 is presented on both the write terminals $W_A$, $W_B$ and the read terminals $R_A$, $R_b$ of the memory 29.

The preceding discussion relating to the memory address logic network 53 has progressed on the assumption that a single finish has been detected from the information stored in the activated column of registers in the memory 29. It is of particular significance that with the present race tallying apparatus, not only single, but also double, triple, and even quadruple finish states can be detected and displayed. In the illustrated embodiment, this is accomplished by detecting the double or triple finish states and developing signals representing the address next to be activated in the memory 29. These signals are loaded into the write address register 59 and the corresponding column of registers in the memory 29 is activated in the manner previously discussed. In a race apparatus having only four racing members, a quadruple finish state could only be detected when the win column of registers was activated. Since this is the column to be activated at the start of each race, the columns of the memory 29 do not need to be indexed when a quadrature finish state is detected.

The particular address to be activated upon the detection of a double win state depends upon the particular column of registers in which that state is detected. For example, if two of the racing members finish in the win position so that their electrical signals are stored in the registers of column 00 as discussed with reference to FIG. 1, it is desirable to advance the memory 29 so that the show column of registers 01 is activated for the next finishing racing member. On the other hand, if a double finish state is detected in the place position, it is desirable to activate the also ran column of registers 11. If a triple finish condition is detected in the win column of registers 00, it is desirable to activate the also ran column of registers 11.

This can be accomplished by a logic network network including NAND gates 163, 165 and 167 and a pair of NOR gates 169 and 171. The existing state of the write address register 59 can be detected by introducing a signal on the conductor 143 through an inverter 173 and into the NAND gate 163. The NAND gate 163 can also be connected to receive an input signal on the conductor 47 signifying a double finish state. The output of the NAND gate 163 can be introduced through the NOR gate 169 to provide a signal representing the most significant digit in the address to be activated. The outputs of the NAND gates 165 to 167 can be introduced to both of the NOR gates 169 and 171. The output of NOR gate 171 can be connected to the write address register 59 to provide a signal corresponding to the least significant digit in the address to be activated. Following this logic, the detection of a double finish state when the register 59 is in a 00 address state will produce a 0 and 1 on the conductors 55 and 57 respectively. If the register 59 is in the 10 address state a 1 will appear on both of the conductors 55 and 57 to activate the also ran column of registers.

If a triple finish state is detected, a signal appears on the conductor 49 as previously discussed. This signal can be introduced through an inverter 174 to the NOR gate 157, and the conductor 159 can provide an input to the NAND gate 167. The input of the NAND gate 167 can also be connected to the connector 143 to detect the least significant digit in the address stored in the register 59. Following the logic through the gates 167–171 it will be apparent that the presence of the address 00 in the register 59 and the detection of a triple finish state will produce a one on each of the conductors 55 and 57. Thus a triple finish state in the win column of registers 00 will result in the activation of the also ran columns of registers 11.

The presence of either a double or a triple finish state results in the presence of a signal on the conductor 159. This signal can be introduced to a NAND gate 175 along with the step pulse on the conductor 65. The resulting signal at the output of the NAND gate 175 can be used to load the address signals on the conductors 55 and 57 into the register 59.

In the illustrated embodiment, a quadruple finish state can only occur when the win column of registers 00 is activated. Since there will be no racing members left to finish the race, it is not desirable to advance the register 59 to activate any of the other columns of registers. This quadruple finish state can be detected by the decoder 101 which provides a $\overline{\text{QUAD}}$ signal on the conductor 113 as previously discussed. This signal can be introduced through the NOR gate 117 and the conductor 118 can be connected to provide an input to the AND gate 137. This input will be low when the quadruple finish state is detected. Even though the step pulse from the step generator 135 may be provided on the conductor 65, it will not be enabled through the ANd gate 137 due to the low logic state on the conductor 118. Thus the write address register 59 will not be advanced when the quadruple finish state is detected.

In this particular embodiment of the invention, each racing member finishing the race is halted at the finish line and the associated sensor switch 11–17 remains closed for that particular racing member. It follows that the corresponding electrical signal on the associated conductors 121–127 would remain high unless it was otherwise inhibited. It may be desirable to cancel these electrical signals once they have been tallied in the memory 29 so that they do not load registers in subsequently activated columns of the memory 29.

This is accomplished in the illustrated embodiment by introducing the step pulse on the conductor 65 through a plurality of NAND gates 177, 179, 181, 183, a plurality of respective NOR gates 185, 187, 189, and 191 and a plurality of respective inverters 193, 195, 197 and 199 to the clear terminals of the respective flip-flops 89, 87, 85 and 83. The NAND gates 173–183 can also be connected to receive input signals from the respective conductors 41, 39, 37 and 35.

If an electrical signal on one of the conductors 21–27 has been stored in the memory 29, a corresponding electrical signal will appear on the associated conductor 35–41 at the output of the memory 29. These signals can be used to enable the step pulse on the conductor 65 to pass through the associated NAND gate 177–183, the associated NOR gate 185–191, and the associated inverter 193–199 to clear the associated flip-flop 83–89. This changes the state of the associated flip-flop 83–89 so that the signal on the associated sensor switch 11–17 cannot pass through the associated NAND gate 75–81. Then when a new column of registers is activated in the memory 29, the electrical signal associated with those racing members which have already finished the race are not retallied in the memory 29.

When all of the racing members are present at the finish line and have completed their final laps, signals representative of these states can be introduced on conductors 201 and 203 respectively to a NAND gate 205. The output of the NAND gate 205 can be introduced through an inverter 207 to change the state of the read/write flip-flop 106. This will place the tally apparatus in a read mode signifying the completion of the race.

When the flip-flop 106 is in the read mode of operation, a signal appears on a conductor 209 which can be introduced to a pair of AND gates 211 and 213 in the read address steering gates 69. The conductor 209 also provides inputs to the J & K terminals of a pair of flip-flops on 215 and 217 which form a readout address register. A read clock 219 is connected to the clock terminal of the flip-flop 215 and provides pulses which can have a periodic rate variable to provide the desired readout rate for the tally display. The Q terminal of the flip-flop 215 can be introduced on a conductor 221 to the clock terminal of the flip-flop 217 as well as a pair of NAND gates 223 and 225 and the AND gate 211. The signal on this conductor 221 can be used as an $A_R$ signal in addressing the least significant bit of the registers in the memory 29. The $\overline{Q}$ terminal of the register 215 provides a not $A_R$ signal on a conductor 227 which can be connected to a pair of NAND gates 229 and 231.

The Q terminal of the flip-flop 217 provides a $B_R$ signal on a conductor 233 which can be connected to the NAND gates 225 and 229 and also the AND gate 213 in the steering gate 69. This $B_R$ signal can be used to address the most significant bit in the registers of the memory 29.

A not $B_R$ signal can be provided on the $\overline{Q}$ terminal of the flip-flop 217 and introduced on a conductor 235 to the NAND gates 223 and 231. The outputs of the NAND gates 223, 225, 229 and 231 can be introduced through inverters 237, 239, 241 and 243, respectively, to provide read signals for the tally display. These read signals provide a periodic and sequential readout of the win, place, show and also ran finishing information which is introduced to the tally display 77.

In a particular embodiment of the tally apparatus, it may be desirable to purge the various registers in the apparatus before each tally sequence. In the illustrated embodiment, a pulse is provided on a conductor 245 when power is first introduced to the tally apparatus. This pulse can be used to clear the flip-flops 83–89, 215 and 217. A pulse may also be provided on a conductor 247 during the initial second of the first lap. This pulse can be used to clock the enable gate $G_R$ in the memory 29. The conductor 247 can also be connected to the NAND gate 247 along with the conductor 131 to initiate a step pulse from the generator 135 on the conductor 65. The conductors 65 and 247 can provide inputs to a NAND gate 251 which can be used to clock the write address register 59. Finally, a NOR gate 253 and a NAND gate 255 can be connected as indicated in FIGS. 2 and 3 to purge the write address register 59.

What is claimed is:

1. Apparatus for tallying the finish results of a plurality of racing members having properties for being raced between a starting line and a finish line, including:
   sensor means for individually sensing the arrival of the racing members at the finish line and for providing finish information in response to the arrival of each of the racing members at the finish line;
   means responsive to the finish information for tallying the finish sequence of the racing members, the tallying means being responsive to an associated pair of the racing members finishing within a predetermined time interval for tallying the associated racing members in the finish position; and
   means coupled to the tallying means for visibly displaying the finish sequence of the racing members, the display means including means for visibly displaying the associated racing members in the same finish position.

2. The apparatus recited in claim 1 wherein the tallying means comprises:
   memory means having an input and an output and having for each of the racing members a plurality of registers, the registers having consecutive addresses and being representative of each of a win, place, and show finish position;
   means for addressing the registers representative of one of the win, place and show finish positions to receive the information from the sensor means, to store the information from the sensor means, and to provide the information at the output of the memory means;
   means coupled to the addressing means for decoding the information stored in the addressed registers and for providing a particular signal representative of one of a single and double tied finish state; and
   the addressing means being responsive to the particular signal for addressing a different one of the registers representative of one of the win, place and show finish positions.

3. The apparatus recited in claim 2 wherein the addressing means includes:
   register means for storing the address of the plurality of registers to be addressed by the addressing means;
   means responsive to the particular signal representative of a single finish state for indexing the register means;
   means responsive to the address presently stored in the register means and responsive to the particular signal representative of the double finish state for presenting to the register means a particular address twice removed from the address stored in the register means; and
   means responsive to the particular signal for enabling the particular address into the register means to address the associated plurality of registers in the memory means.

4. The apparatus recited in claim 3 wherein the racing members finishing within a predetermined time interval of each other are to be tallied in the same finish position and the signal producing means includes means responsive to the particular signal for delaying the enabling signal a period of time greater than the predetermined time interval.

5. The appartaus recited in claim 1 wherein the tallying means includes:
   a clock having a periodic signal with a first time interval and a second time interval;
   memory means having a plurality of registers and being responsive to the clock signal in the first time interval to receive and store the finish information in the registers; and
   decoding means responsive to the clock signal in the second time interval for decoding the finish information in the registers of the memory means.

6. Apparatus for tallying the results of a race including:
   a plurality of racing members having properties for being raced between a start line and a finish line;
   means for individually sensing the arrival of each of the racing members at the finish line and for providing a separate signal upon the arrival of each of the associated members at the finish line;
   memory means having an input and an output and including a first plurality of registers associated with the racing members and representing a win finish position, having a second plurality of registers associated with the racing members and representing a place finish position, and having a third plurality of registers associated with the racing members and representing a show finish position;
   means for selectively activating the first plurality of registers representing the win finish position to receive information at the input of the memory means;
   means coupled to the sensing means and the input of the memory means for storing in the first plurality of registers information associated with the separate signal of the racing member first arriving at the finish line, and for storing in the first plurality of registers information associated with the separate signal of the racing member secondly arriving at the finish line within a predetermined time interval of the arrival of the first arriving racing member;
   decoding means coupled to the output of the memory means for determining the presence in the first plurality of registers of information associated with the arrival of both the first arriving racing member and the second arriving racing member at the finish line and for providing a particular signal representing a dual win state;
   the selective activating means being responsive to the particular signal for activating the third plurality of registers to receive information at the input of the memory means, whereby the information associated with the separate signal of the next arriving racing member is stored in the third plurality of registers associated with the show finish position; and means coupled to the output of the memory means for displaying the state of the registers in the memory means to provide an indication of the dual win state.

7. The apparatus of claim 6 wherein the selective activating means include:

logic means coupled to the memory means and responsive to the particular signal to produce a first signal and a second signal, the first signal being representative of the address of the third set of registers in the memory means;

delay means responsive to the second signal for delaying the second signal by a time period greater than the predetermined time interval; and register means responsive to the delayed second signal for storing the first signal and for selectively activating the third plurality of registers in the memory means to receive the signals at the input of the memory means.

8. The apparatus of claim 6 wherein the storing means includes a first oscillator having a first frequency for clocking the separate signals into the memory means and the display means includes a second oscillator having a second frequency greater than the first frequency for clocking the information from the registers of the memory means to provide a display indicating the dual win state.

9. Apparatus for tallying the finish results of a plurality of racing members having properties for being raced between a starting line and a finish line, including:

sensor means for individually sensing the arrival of the racing members at the finish line and for providing an information signal in response to the arrival of each of the racing members at the finish line;

memory means having an input, an output, and a plurality of registers each associated with one of the racing members and including a first plurality of registers having a first address and being associated with a win finish position, a second plurality of registers having a second address and being associated with a 'place' finish position, and a third plurality of registers having a third address and being associated with a 'show' finish position;

means for activating one of the first, second and third plurality of registers to receive the information signal from the sensor means, to store the information signal, and to provide the information at the output of the memory means;

means coupled to the output of the memory means for decoding the information stored in the activated plurality of registers and for providing a particular signal representative of a single, double or triple finish state;

means responsive to the address of the activated plurality of registers and responsive to the particular signal for providing a particular address once removed from the address of the activated plurality of registers when the particular signal represents a single finish state, and twice removed from the address of the activated plurality of registers when the particular signal represents a double finish state;

the activating means being responsive to the particular address for activating the plurality of registers in the memory means having the particular address; and means coupled to the output of the memory means for displaying the information in the registers of the memory means to provide an indication of the race finish results.

10. The apparatus recited in claim 9 wherein the activating means includes:

register means for storing the address of the plurality of registers to be activated in the memory means; and means responsive to the particular signal representative of the single finish state for indexing the register means a single address.

11. The apparatus recited in claim 9 wherein the activating means includes:

register means for storing the address of the plurality of registers to be activated in the memory means;

means responsive to the particular signal representative of the double finish state for producing the particular address twice removed from the address of the activated plurality of registers; and means responsive to the particular signal for loading the particular address into the register means.

12. The apparatus recited in claim 11 wherein the racing members finishing within a predetermined time interval of each other are to be tallied in the same finish position and the loading means includes means responsive to the particular signal for delaying the particular signal a period of time greater than the predetermined time interval.

13. The apparatus recited in claim 9 further comprising:

a clock having a periodic signal with a first time interval and a second time interval;

the activating means being responsive to the clock signal in the first time interval for activating one of the first, second, and third plurality of registers to receive the information signal from the sensor means, to store the information signal in the memory means, and to provide the information at the output of the memory means; and the decoding means being responsive to the clock signal in the second time interval for providing the particular signal representative of a single, double or triple finish state.

14. Apparatus for tallying the activation of a plurality of members each having properties for switching from a nonactivated state to an activated state including:

a clock providing a periodic clock signal having in each of a first period and a second period a first time interval and a second time interval;

means responsive to the clock signal in the first time interval of the first period for tallying a first group of the members which have switched to the activated state;

means responsive to the clock signal in the second time interval of the first period for providing a particular signal representative of the number of members in the first group;

means responsive to the clock signal in the first time interval of the second period for tallying a second group of the members, exclusive of the first group of the members, which have switched to the activated state;

display means having a plurality of consecutive timing categories including a first category for displaying the first group of members and a second category for displaying the second group of members; and means included in the display means and being responsive to the particular signal for separating the first category and the second category by a number of categories equal to the number of members in the first group minus one.

15. The apparatus recited in claim 14 and being adapted for use in tallying the results of a race wherein:

the timing categories comprise consecutive win, place, show and also ran finish positions;

the first group of members is displayed in the win position;

the second group of members is displayed in the place position when the particular signal represents one member in the first group;

the second group of members is displayed in the show position when the particular signal represents two members in the first group; and the second group of members is displayed in the also ran position when the particular signal represents three members in the first group.

16. A method for tallying the activation of a plurality of members each having properties for switching from a nonactivated state to an activated state, including the steps of:

providing a clock with a periodic clock signal having in each of a first period and a second period a first time interval and a second time interval;

during the first time interval of the first period of the clock signal, tallying a first group of the members which have switched to the activated state;

during the second time interval of the first period of the clock signal, providing a particular signal representative of the number of members in the first group;

during the first time interval of the second period of the clock signal tallying a second group of the members, exclusive of the first group of the members, which have switched to the activated state;

providing a display having a plurality of consecutive timing categories including a first category for displaying the first group of members and a second category for displaying the second group of members; and separating the first category in the display from the second category in the display by a number of categories equal to the number of members in the first group minus one.

17. The method recited in claim 16 for use in tallying the results of a race wherein the timing categories comprise consecutive win, place, show and also ran finish positions, the method further comprising the steps of:

displaying the first group of members in the win position;

displaying the second group of members in the place position when the particular signal represents one member in the first group;

displaying the second group of members in the show position when the particular signal represents two members in the first group; and displaying the second group of members in the also ran position when the particular signal represents three members in the first group.

* * * * *